(12) United States Patent
Sharp et al.

(10) Patent No.: US 7,706,135 B2
(45) Date of Patent: Apr. 27, 2010

(54) LOAD CENTER WITH DISPLACEABLE WIRING PLATES

(75) Inventors: Jeffrey O. Sharp, Lexington, KY (US); Henry B. Joines, Lexington, KY (US)

(73) Assignee: Schneider Electric USA, Inc., Palatine, IL (US)

( * ) Notice: Subject to any disclaimer, the term of this patent is extended or adjusted under 35 U.S.C. 154(b) by 202 days.

(21) Appl. No.: 12/005,781

(22) Filed: Dec. 28, 2007

(65) Prior Publication Data

US 2009/0168306 A1    Jul. 2, 2009

(51) Int. Cl.
*H02B 1/20* (2006.01)
(52) U.S. Cl. .................. 361/648; 361/627; 361/663; 174/50; 439/680
(58) Field of Classification Search .......... 361/627, 361/663, 643, 664, 676, 648
See application file for complete search history.

(56) References Cited

U.S. PATENT DOCUMENTS

| | | | | | |
|---|---|---|---|---|---|
| 4,327,396 | A | * | 4/1982 | Schacht | 361/676 |
| 5,549,488 | A | * | 8/1996 | Berndt et al. | 439/680 |
| 5,761,027 | A | * | 6/1998 | Flegel | 361/664 |
| 5,870,276 | A | * | 2/1999 | Leach et al. | 361/627 |
| 6,147,306 | A | * | 11/2000 | Wilkins | 174/58 |
| 6,160,700 | A | * | 12/2000 | Wise et al. | 361/643 |
| 6,774,307 | B2 | * | 8/2004 | Kruse et al. | 174/53 |
| 6,920,038 | B2 | * | 7/2005 | Gehlbach | 361/648 |
| 6,945,813 | B1 | * | 9/2005 | Kellerman | 439/517 |
| 7,397,652 | B2 | * | 7/2008 | Price et al. | 361/643 |

* cited by examiner

*Primary Examiner*—Jayprakash N Gandhi
*Assistant Examiner*—Courtney Smith

(57) ABSTRACT

A load center enclosure with displaceable end wall plates for easily accessing the wall cavity above and below the load center and adding additional electrical conductors in post installation applications.

5 Claims, 5 Drawing Sheets

LOAD CENTER WITH DISPLACEABLE WIRING PLATES

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to load centers for electrical distribution systems, and particularly to load center end wall construction for easy post installation wiring.

BACKGROUND OF THE INVENTION

Load centers or service entrance boxes for electrical distribution systems in residential or commercial applications are generally wired during the rough-in stage of construction, before the sheetrock or other finished wall surfaces are installed. The load center enclosure can be either surface mounted on the wall surface with the sides of the load center exposed or flush mounted between studs or finished wall support members such that the finished wall surface, when installed, will be approximately flush with the outside edge of the load center enclosure. For surface mounted load centers, adding additional circuits to the load center and installing the necessary electrical conductors is not a problem since the sides and end walls of the load center enclosure are exposed and easily accessible. However, adding additional circuits and their electrical conductors and associated connecting hardware to a flush mounted load center, after the finished wall is installed, can be difficult, time consuming and expensive. Such work generally requires removing portions of the finished wall above and/or below the load center to permit limited access to the wall cavity and the exterior of the end walls of the load center enclosure. Access to the wall cavity is required for fishing new electrical conductors for the additional circuits from the crawl space and/or attic. Access to the exterior of the load center enclosure end walls is required for installing wire clamping devices and passing the electrical conductors through the wire clamping devices into the load center. After the additional electrical conductors have been installed the removed portions of the finished wall must be replaced and repainted or wallpapered as required. Remodeling and/or upgrading the electrical service with one of more new load centers generally requires the same type of disassembly and reassembly of the finished wall. Therefore, it would be desirable for a load center to be provided with a means for easily accessing the wall cavity and the exterior of the load center end walls without having to remove sections of the finished wall.

BRIEF DESCRIPTION OF THE DRAWINGS

The features of the invention will be more clearly understood from the following detailed description of the invention read together with the drawings in which.

Figure 1:
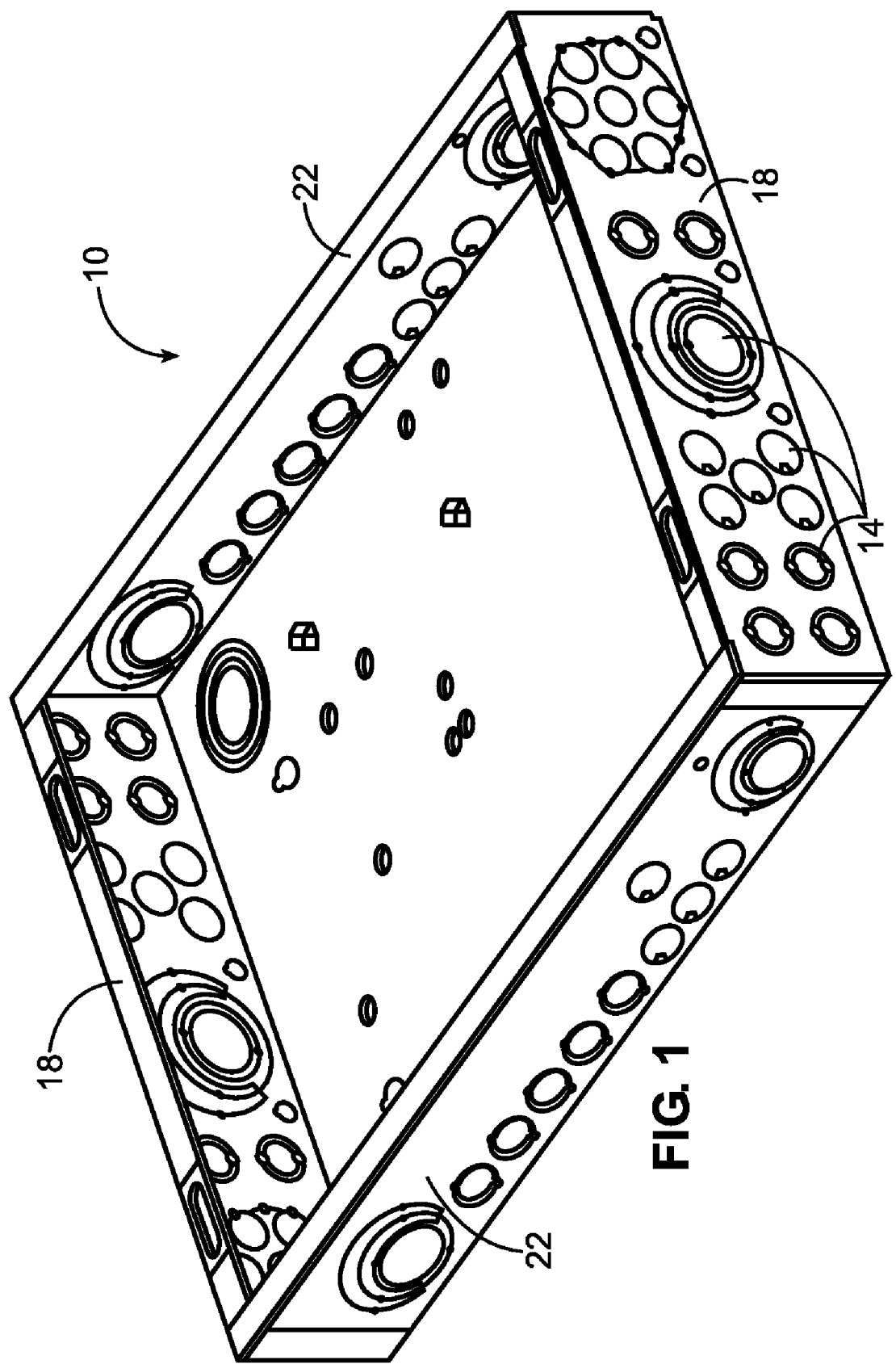
FIG. 1 illustrates in general a load center enclosure of the prior art.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates a typical load center enclosure of the prior art generally indicated by reference numeral 10. The load center enclosure 10 is generally made from formed and welded sheet metal or molded plastic parts with partially punched knockouts 14 provided in the end walls 18 and side walls 22. The knockouts 14, which can be of various sizes and patterns as shown, are removed as required during the wiring process. A wire clamping device 26 (FIG. 2) is placed in each of the used knockout openings for securing the electrical conductors 30 (FIG. 2) that enter the load center enclosure 10.

Figure 2:
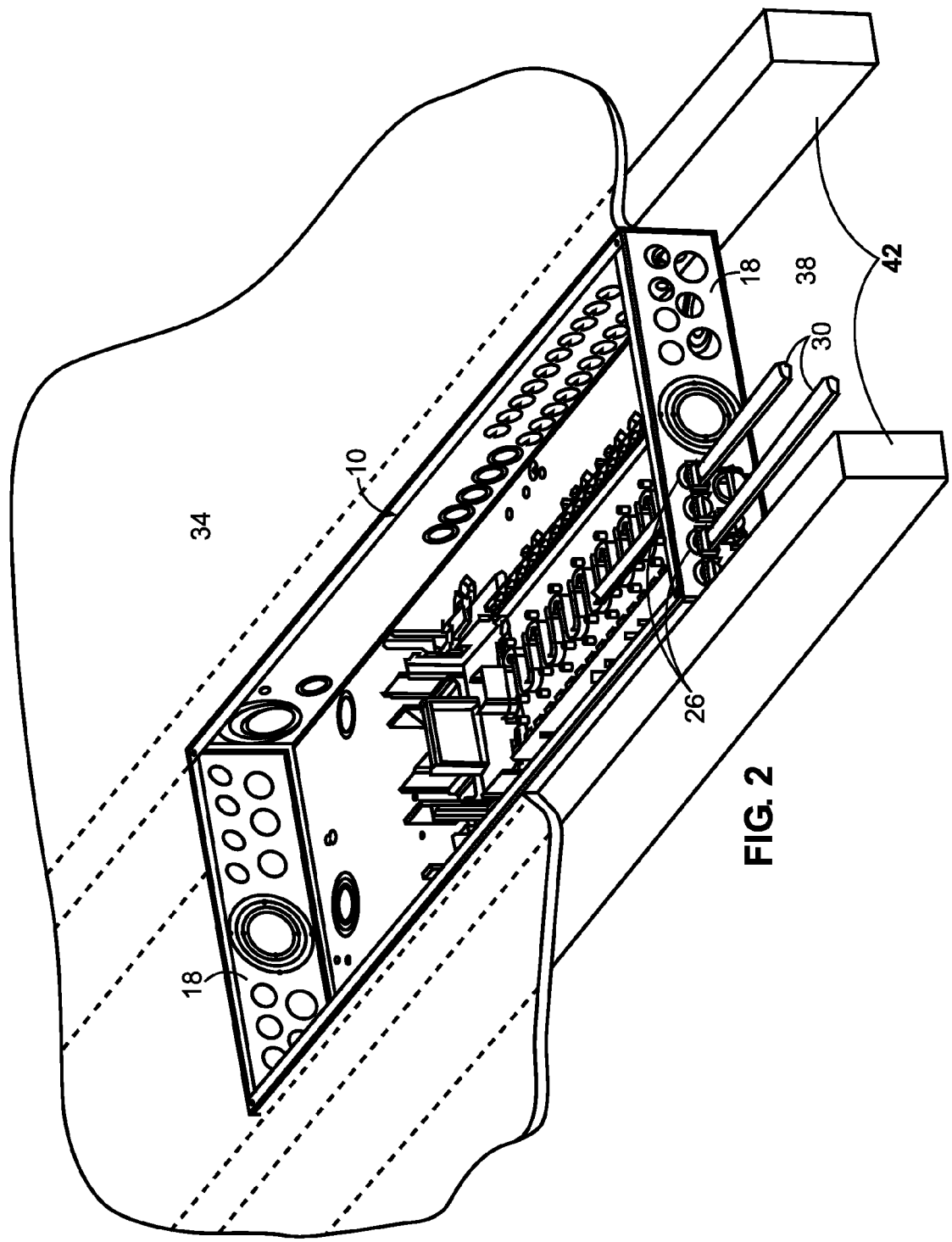
FIG. 2 illustrates the load center of FIG. 1 as normally installed in a residential or commercial building wall.

FIG. 2 illustrates the load center enclosure 10 of FIG. 1, installed in a flush mounted application with a finished wall 34, shown in cutaway, surrounding the load center enclosure 10. As can be easily seen, the load center end walls 18 and the wall cavity 38 between studs or wall support members 42 are easily accessible for installing electrical conductors 30 during the rough-in stage, prior to installing the finished wall covering 34. However, after the finished wall 34 is installed on the wall support members 42, the load center end walls 18 and the wall cavity 38 between the support members 42 are both covered by the finished wall 34 and are no longer accessible.

Figure 3:
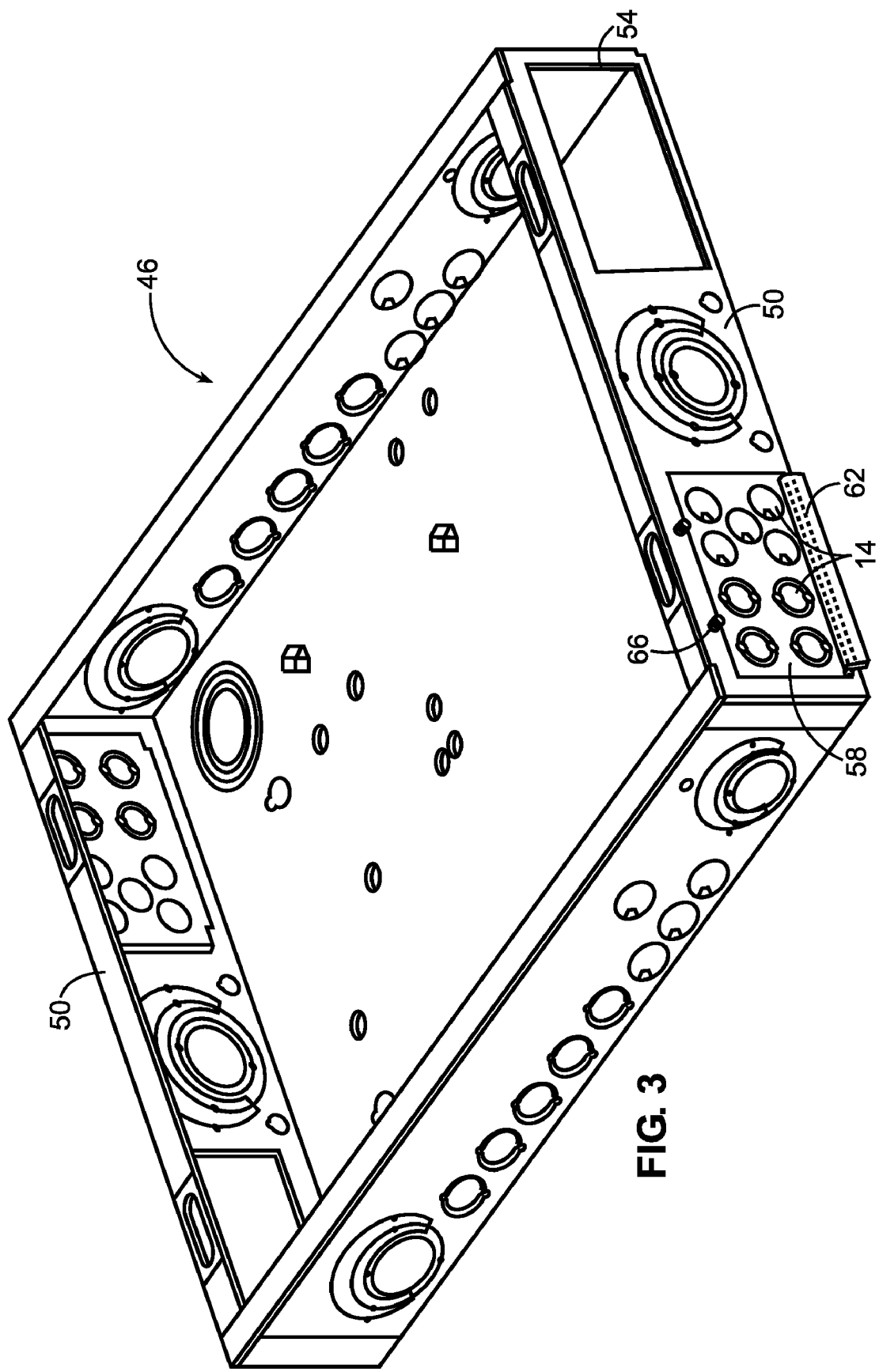
FIG. 3 illustrate a load center enclosure constructed in accordance with the present invention.
Figure 4:
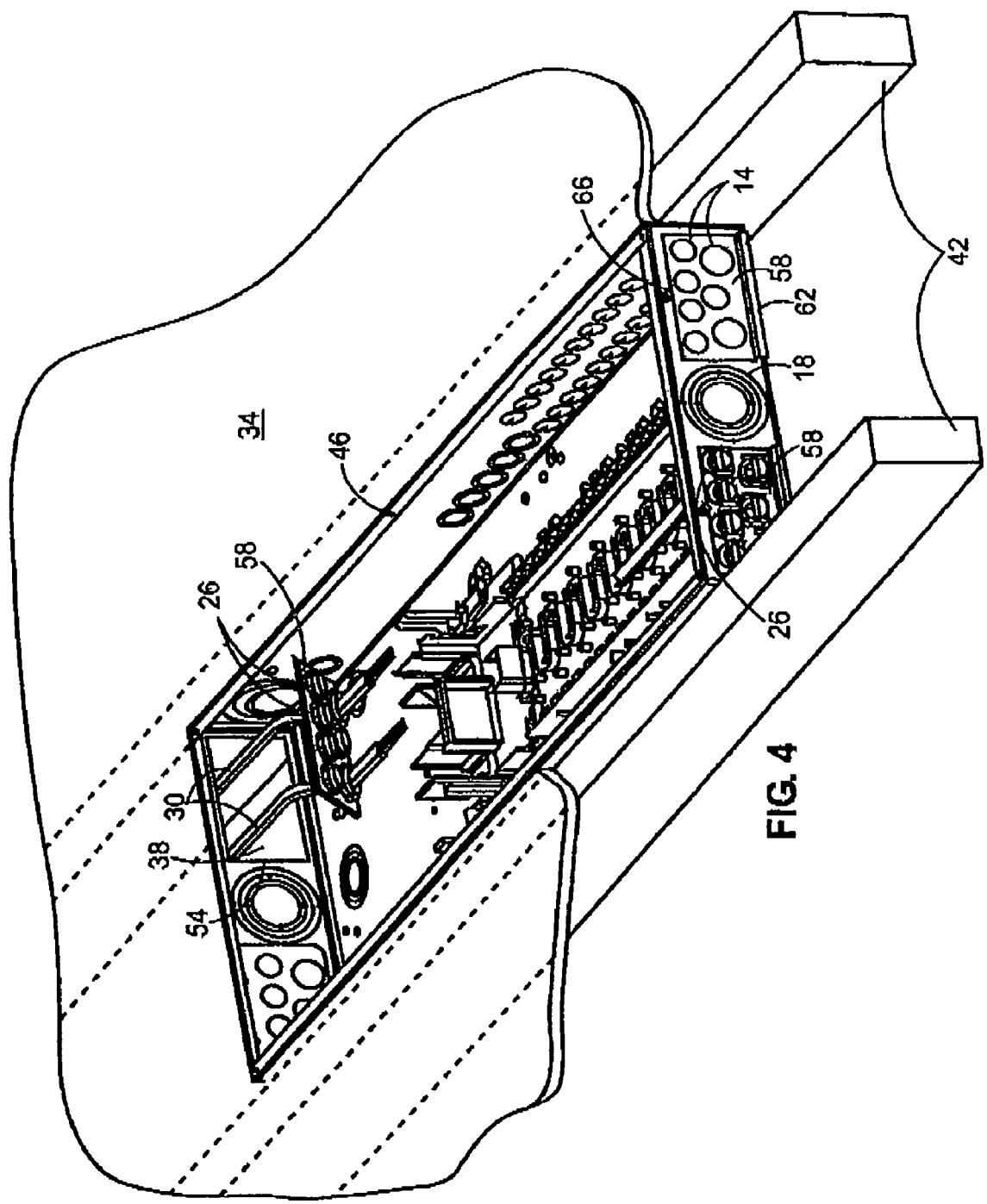
FIG. 4 illustrates the load center enclosure of FIG. 3 installed in a residential or commercial building wall.

FIG. 3 illustrates a load center enclosure 46 configured in accordance with the present invention. The basic construction of the load center enclosure 46 is similar to the prior art load center enclosure 10. The end walls 50 of the load center enclosure 46 define at least one aperture 54 sized to permit sufficient access to the wall cavity 38 for fishing electrical conductors 30. Each aperture 54 receives a displaceable plate 58. Each plate 58 defines a plurality of knockouts 14. The plate 58 is held in place on the end wall 50 by an interlocking flange 62 that engages an outside surface of the end wall 50 immediately adjacent an edge of the aperture 54 and at least one screw 66 for securing the plate 58 to the end wall 50 from inside the enclosure 46. It is not required that the plate 58 be removed from the end wall 50 during the rough-in wiring since the finished wall 34 has not yet been installed. However, after the finished wall 34 has been installed, as shown in FIG. 4, after removing the screw 66, the plate 58 can be easily displaced a sufficient distance to provide adequate access to the wall cavity 38 for fishing new electrical conductors 30 from the crawl space and/or attic. Access to the exterior of the plate 58 is also provided for installing wire clamping devices 26, which provide strain relief for the electrical conductors.

FIG. 4 illustrates the load center enclosure 46 of FIG. 3 installed in a wall cavity 38. The finished wall 34 is shown in partial view to illustrate the how access to the wall cavity 38 is obtained through the aperture 54 by displacing the displaceable plate 58. When the plate 58 is displaced the aperture 54 provides sufficient access to the wall cavity 38 for locating and fishing conductors in the wall cavity 38. The displaced plate 58 also provides sufficient working room to install wire clamping devices 26 in the knockouts 14, pull the conductors 30 through the wire clamping devices 26 and clamp them in place. The displaceable plate 58 is then reinstalled into the aperture 54 and secured with the screw 66.

Figure 5:
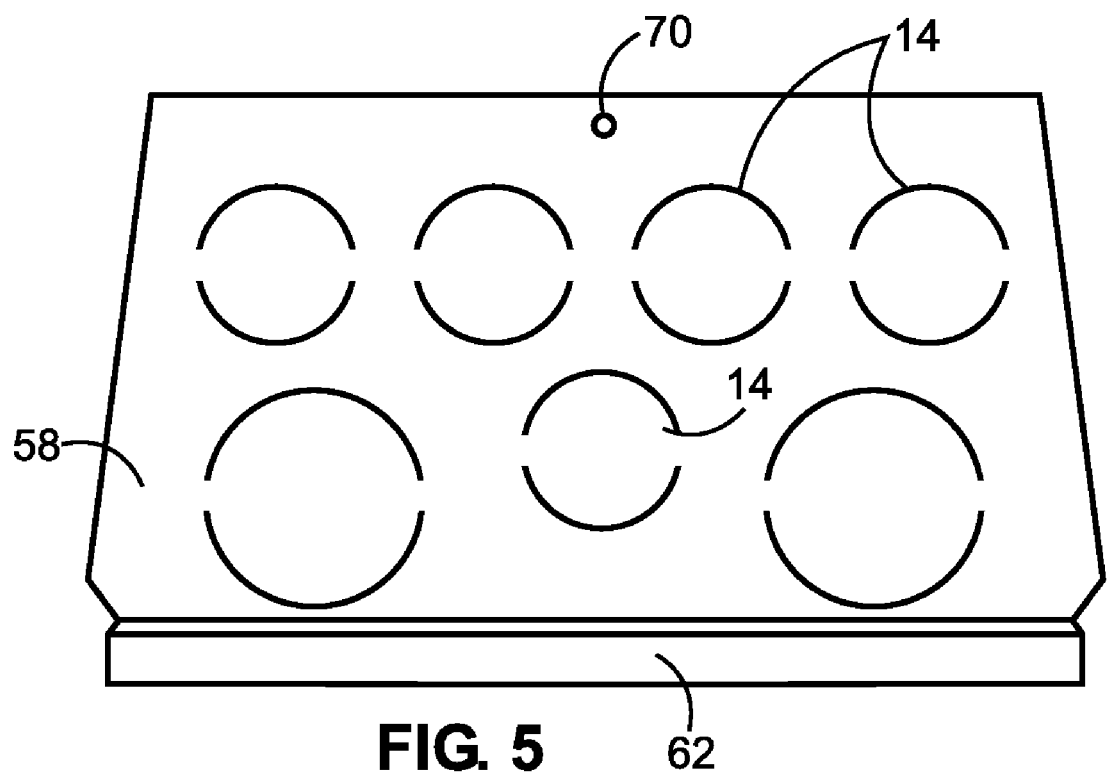
FIG. 5 illustrates a removable end wall plate constructed in accordance with the present invention.

FIG. 5 illustrates a displaceable plate 58 configured in accordance with the present invention. The plate includes a locking flange 62 which is offset slightly from the main surface of the plate 58. The plate also includes a plurality of knockouts 14 and at least one aperture 70 for receiving the at least one securing screw 66

We claim:

1. A load center enclosure configured for easily adding additional electrical conductors to the load center after a finished wall covering is installed, the enclosure comprising:
   a box defined by a back panel, two parallel side walls extending from and being generally perpendicularly to the back panel and two parallel end walls extending from and being generally perpendicular to the back panel, the side walls and the end walls being connected together along a adjacent edge, each end wall defining at least one generally rectangular aperture;
   at least one displaceable plate for selectively closing and opening the at least one generally rectangular aperture such that access to a wall cavity defined by the finish wall covering and two spaced apart wall support members immediately outside the end walls is provided when required for adding additional branch circuit conductors enclosed within the wall cavity to the load center.

2. The enclosure of claim 1, wherein the at least one generally rectangular aperture is of sufficient size to permit access to the wall cavity above or below the enclosure end wall for locating and pulling electrical conductors inserted into the wall cavity from a crawl space or attic space for new branch circuits.

3. The enclosure of claim 1, wherein each displaceable plate is attached to the end wall by a flange engaging an outside surface of the end wall adjacent the generally rectangular aperture and at least one fastening means for securing the displaceable plate from inside the box.

4. The enclosure of claim 1 wherein the at least one displaceable plate defines a plurality of removable knockouts for receiving wire clamping devices through which electrical conductors for branch circuits pass.

5. The enclosure of claim 4 wherein the displaceable plates, when displaced into the enclosure, provide sufficient access to the outside surface of the displaceable plates for installing and securing wire clamping devices in openings provided by the removable knockouts and for securing the new electrical conductors in the installed wire clamping devices.

* * * * *